United States Patent
Fortune et al.

(10) Patent No.: US 9,671,503 B2
(45) Date of Patent: Jun. 6, 2017

(54) MOBILE PLATFORM FOR CONVEYING AN NSS DEVICE

(75) Inventors: Kenneth Fortune, Rangiora (NZ); James M. Janky, Los Altos, CA (US); Michael V. McCusker, Los Altos, CA (US)

(73) Assignee: Trimble Inc., Sunnyvale, CA (US)

( * ) Notice: Subject to any disclaimer, the term of this patent is extended or adjusted under 35 U.S.C. 154(b) by 772 days.

(21) Appl. No.: 13/566,440

(22) Filed: Aug. 3, 2012

(65) Prior Publication Data
US 2014/0039724 A1 Feb. 6, 2014

Related U.S. Application Data

(60) Provisional application No. 61/515,845, filed on Aug. 6, 2011.

(51) Int. Cl.
*G01S 19/37* (2010.01)
*B63H 19/08* (2006.01)
*G01S 19/54* (2010.01)

(52) U.S. Cl.
CPC ............ *G01S 19/54* (2013.01); *G01S 19/37* (2013.01)

(58) Field of Classification Search
CPC .......... G05D 1/00; G05D 1/0088; B62B 1/18; B62D 61/00; B62D 49/0635; G01S 19/42; G01S 19/51; G01S 1/143; G01R 15/14; G01C 21/165; G01C 15/00; G01C 15/002; G01C 5/00; G01C 15/006; B66F 9/06; B63H 19/08; E02F 3/847

USPC .............. 701/2, 50, 408, 470, 472; 340/988; 33/290, 366.12; 342/357.27; 180/164; 187/222; 382/224

See application file for complete search history.

(56) References Cited

U.S. PATENT DOCUMENTS

| | | | |
|---|---|---|---|
| 4,691,444 A * | 9/1987 | Capps ................... | G01C 15/00 33/290 |
| 4,754,553 A * | 7/1988 | Simpson ................ | G01C 15/00 33/1 H |
| 5,990,809 A * | 11/1999 | Howard ................. | B63H 19/08 324/323 |
| 6,008,757 A * | 12/1999 | Boulianne .............. | G01S 19/51 33/313 |
| 6,241,047 B1 * | 6/2001 | Gilliland .................. | B66F 9/06 180/19.3 |
| 7,448,138 B1 * | 11/2008 | Vanneman ........... | G01C 15/006 33/290 |
| 7,480,511 B2 | 1/2009 | O'Meagher | |
| 7,693,659 B2 * | 4/2010 | Zimmerman ........ | G01C 21/165 340/988 |
| 7,775,312 B2 | 8/2010 | Maggio | |
| 8,340,438 B2 | 12/2012 | Anderson | |
| 2001/0045534 A1 * | 11/2001 | Kimura ................... | E02F 3/847 250/559.38 |
| 2003/0114984 A1 * | 6/2003 | Scherzinger .......... | G01C 15/00 701/472 |

(Continued)

*Primary Examiner* — Yuri Kan
(74) *Attorney, Agent, or Firm* — Kilpatrick Townsend & Stockton LLP

(57) ABSTRACT

A survey instrument conveyance is disclosed. One embodiment includes a mobile platform having a set of wheels attached thereto. In addition, a mechanical coupling assembly is used to couple a survey instrument to the mobile platform. An adjustable position mechanism is coupled to the mechanical coupling assembly to raise and lower the survey instrument relative to the mobile platform.

20 Claims, 12 Drawing Sheets

(56) References Cited

U.S. PATENT DOCUMENTS

| | | | |
|---|---|---|---|
| 2006/0271263 A1* | 11/2006 | Self | G01S 3/143 701/50 |
| 2006/0278454 A1* | 12/2006 | Maggio | B62D 49/0635 180/164 |
| 2009/0119050 A1* | 5/2009 | Hayashi | G01C 15/002 702/94 |
| 2010/0079333 A1 | 4/2010 | Janky et al. | |
| 2010/0214161 A1 | 8/2010 | Talbot et al. | |
| 2011/0137491 A1* | 6/2011 | Self | G01S 3/143 701/2 |
| 2011/0150348 A1* | 6/2011 | Anderson | G05D 1/0088 382/224 |
| 2011/0238303 A1* | 9/2011 | Scherzinger | G01C 15/00 701/408 |

* cited by examiner

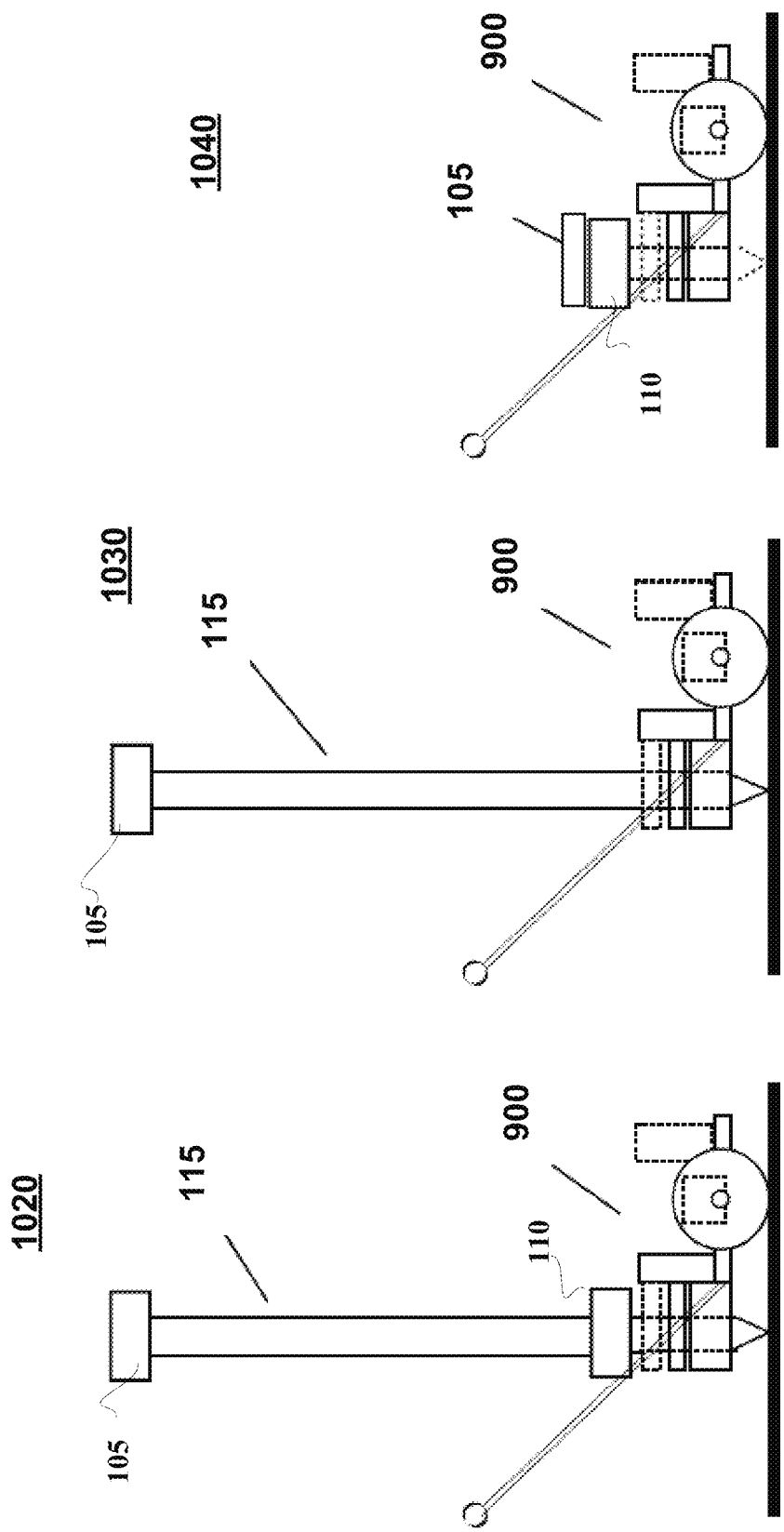

MOBILE PLATFORM FOR CONVEYING AN NSS DEVICE

RELATED U.S. APPLICATION

This application claims priority to the provisional patent application Ser. No. 61/515,845, entitled "MOBILE PLATFORM FOR CONVEYING A GNSS RECEIVER SYSTEM," with filing date Aug. 6, 2011, and hereby incorporated by reference in its entirety.

CROSS REFERENCE TO RELATED U.S. APPLICATIONS

This application is related to U.S. patent application Ser. No. 13/566,218 by Kenneth Fortune, filed on Aug. 3, 2012, entitled "DUAL COAXIAL NSS RECEIVER SYSTEM,", and assigned to the assignee of the present patent application.

TECHNICAL FIELD

Embodiments of the present technology relate to the determination of the spatial location and orientation of an object, based on Navigation Satellite Systems.

BACKGROUND ART

Navigation Satellite Systems (NSS), such as the United States' Global Positioning System (GPS), Glonass, and the like; are used to provide the location of objects. However, the accuracy of the NSS can be affected by signal reflection; a blocked sky view, e.g., such as buildings, trees, hills, and such located between the receiver and the satellite; and many other types of interference.

BRIEF DESCRIPTION OF THE DRAWINGS

The accompanying drawings, which are incorporated in and form a part of this specification, illustrate embodiments of the present technology and, together with the description, serve to explain the principles of the present technology. The drawings referred to in this description should not be understood as being drawn to scale except if specifically noted.

FIG. 10A is a side view of a mobile position determination system with dual coaxial NSS devices, according to one embodiment of the present technology.

FIG. 10B is a side view of a mobile position determination system with a single NSS device, according to one embodiment of the present technology.

FIG. 10C is a side view of a mobile position determination system a retracted pole with dual coaxial NSS devices, according to one embodiment of the present technology.

DESCRIPTIONS OF EMBODIMENTS

Figure 1A:
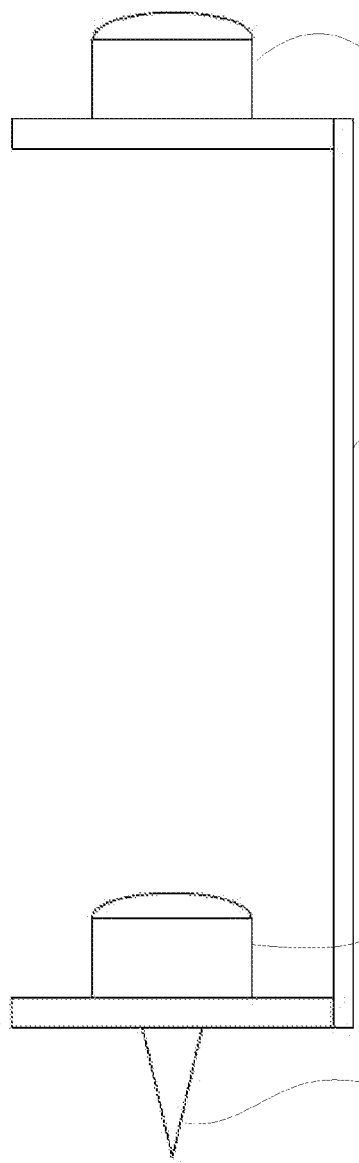
FIGS. 1A and 1B are diagrams of an offset pole section according to one embodiment of the present technology.

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Unless specifically stated otherwise as apparent from the following discussions, it is appreciated that throughout the present description of embodiments, discussions utilizing terms such as "receiving", "storing", "generating", "transmitting", "inferring," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, mobile communication devices.

Overview

A dual coaxial NSS position determiner is disclosed. The dual coaxial NSS utilizes two position determining devices mounted to an object such as a pole, shaft, beam, rod, or the like. The NSS devices are placed at known distances from a certain location such as a distal end of the object. Additionally, since the two NSS position determiners are in fixed reference locations with respect to each other and the point on the object, the pole does not need to be vertically aligned. Instead, the vertical alignment can be within a range of vertical tilt angles without deleteriously affecting the accuracy of the location measurement. In addition, in one embodiment a trigger switch may be utilized to activate the location measurement operations as the object is placed in contact with the point to be measured. By utilizing the dual coaxial NSS position determining methods and systems such as those disclosed herein, the speed of a survey can be increased without reducing the accuracy of the surveyed results.

Utilizing the present technology, a surveyor can perform a survey without having to stop at the specified spot, perform a vertical alignment process, and wait for a signal indicating that the degree of tilt remaining in his current alignment of the pole is satisfactory for taking measurement data. Instead, the surveyor can walk around to one or more spots while operating the measurement pole much like a walking stick. Although the surveyor may stop at the spot it is not necessary. The measurement can be taken as the pole is planted, and as such, the surveyor could walk the survey area planting the pole at different locations as each location is being passed.

For example, in one embodiment the surveyor could walk toward the first spot to be measured and plant the pole while walking past. During the planting of the pole, the survey pole passes from an initially tilted orientation, through any arbitrary arc with any degree of tilt, to a departing tilt orientation. As long as the pole point is planted for a time period, such as, for example, 100-200 milliseconds, precise location data can be obtained. In so doing, the time needed to perform a survey can be reduced to the time needed to walk to each of the spots to be surveyed.

In another embodiment, instead of activating the measurement via a switch that is activated when the pole is planted; the measurement device continually takes and stores measurement data while it is activated. The user "marks" a location by pausing with the device in a given location. For example, during a surveyors walk through an area to be surveyed. During or after the surveyors walk, one embodiment compares the distance covered between sequential measurements and determines the magnitude of the difference in distance between the two measurement locations. In one embodiment, if the distance between the two points is less than a specified threshold, the data point is marked as being a fixed spot or "surveyed point" chosen by the user.

Operation

Figure 1B:
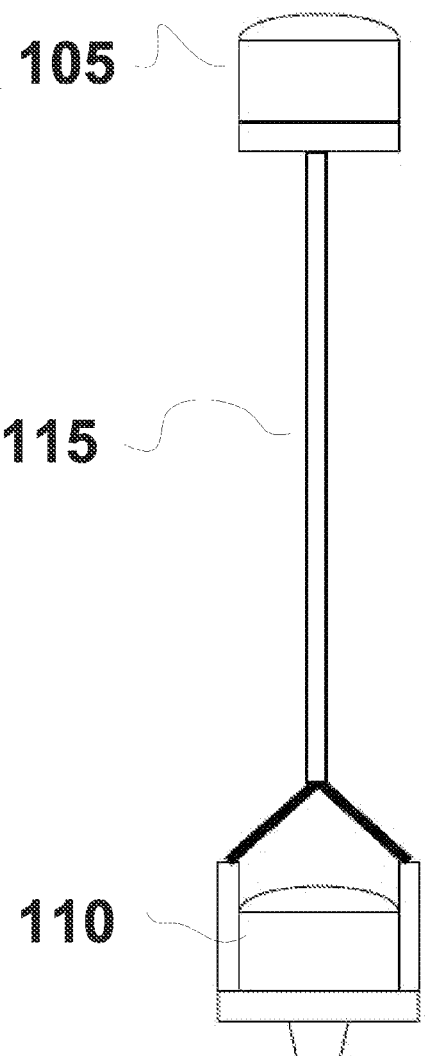

With reference now to FIGS. 1A and 1B diagrams of two of a plurality of possible orientations for position determiner system 100 are shown. In general, position determiner system 100 includes a first NSS device 105 and a second NSS device 110 mounted on a pole-frame 115. Position determiner system 100 also includes a pole tip 120.

In one embodiment, as shown in FIG. 1A, the pole section joining the two NSS devices 105 and 110 are offset from the axis of the two NSS devices 105 and 110.

In another embodiment, as shown in FIG. 1B, the pole section joining the two NSS devices 105 and 110 are along the axis of the two NSS devices 105 and 110. In addition, FIG. 1B also shows the spatial relationship information 136 and 139 which define the distance between the first NSS device 105, the second NSS device 110 and the point 120 to be measured. In one embodiment, the coaxial mounting of the antennas and the pole elements is in an in-line configuration; like a larger top cover for the antenna to provide a bit more visibility to the sky for the patch antenna beneath; structural content in antenna dome to affix pole segment, etc.

Figure 2A:
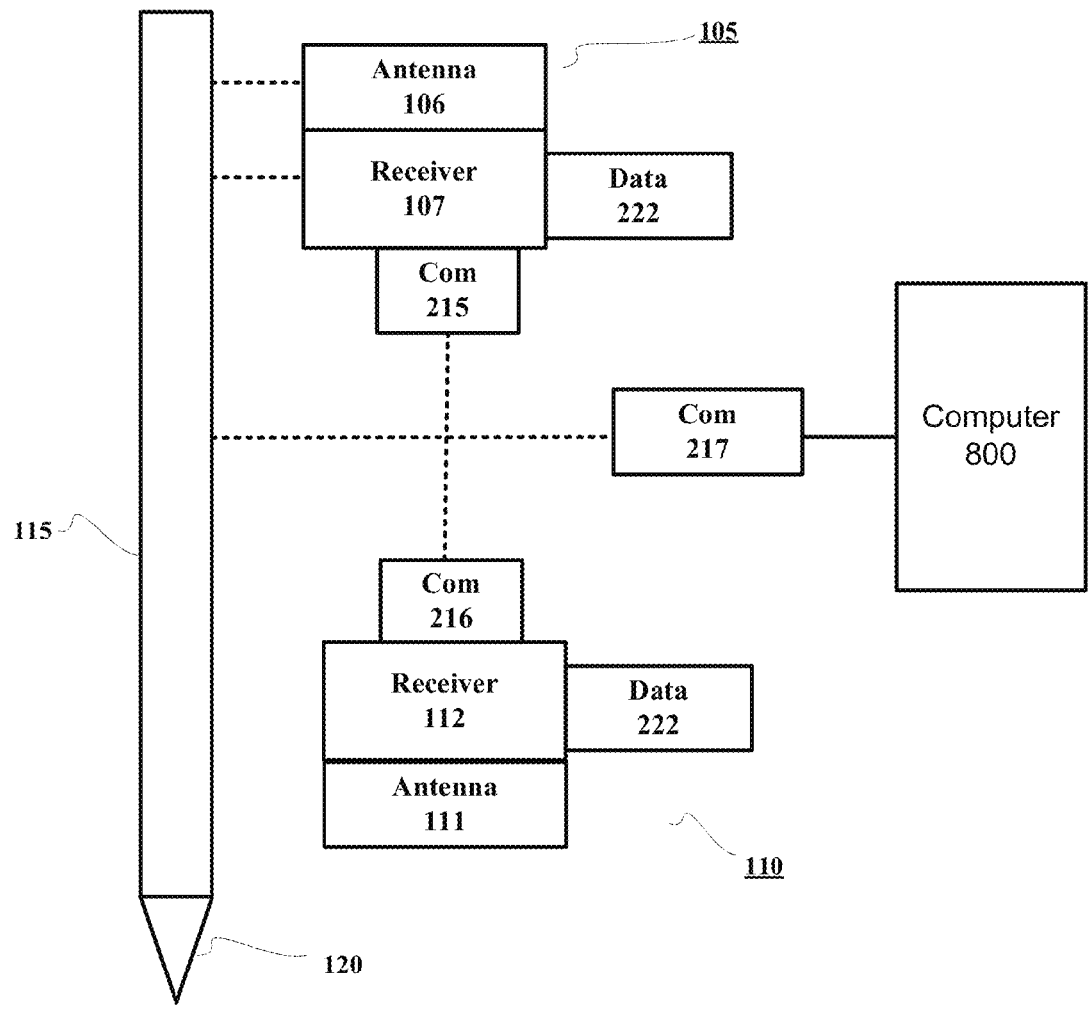
FIG. 2A is a block diagram of the components of the system in one embodiment of the present technology.
Figure 2B:
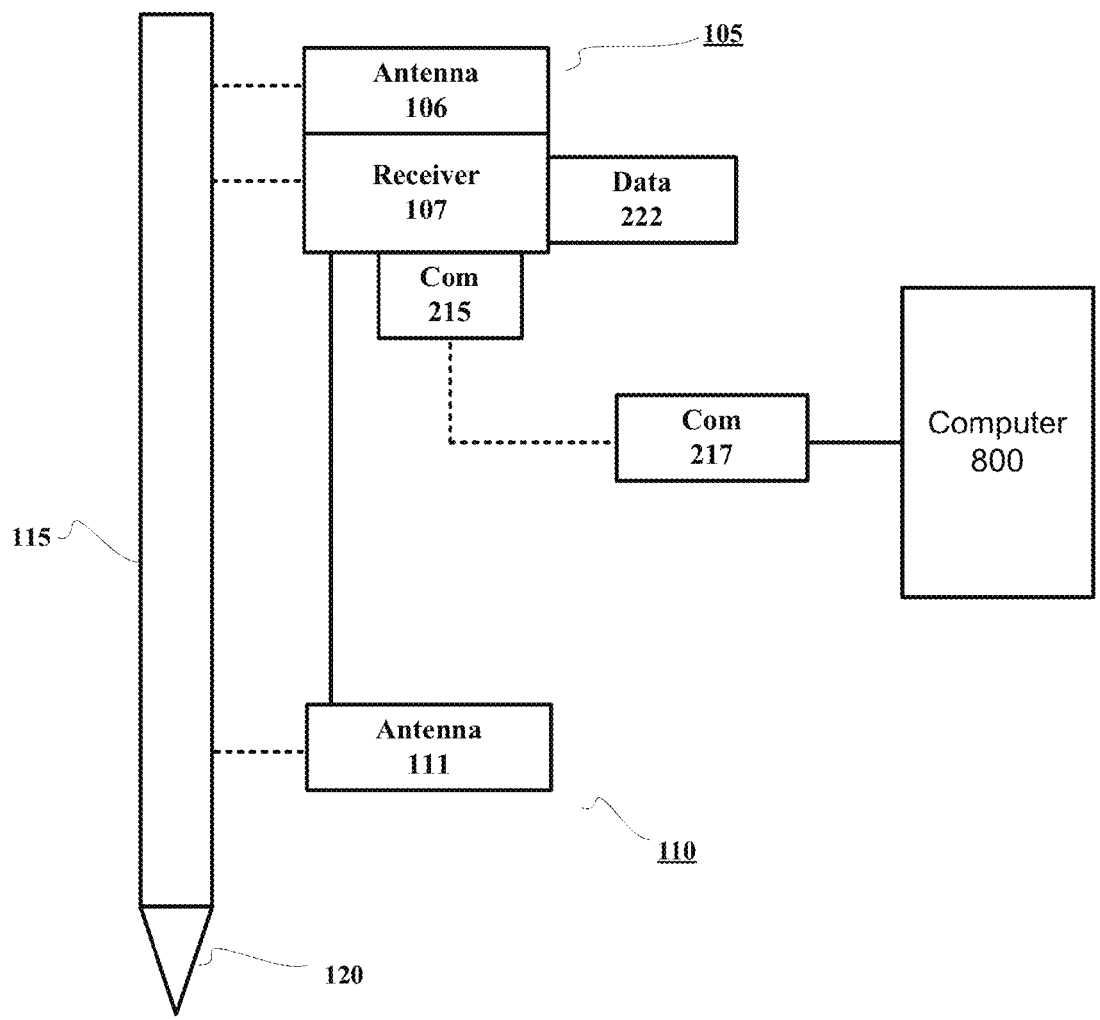
FIG. 2B is a block diagram of the components of the system in another embodiment of the present technology.

With reference now to FIGS. 2A and 2B, block diagrams including further detail of the components of each of the two NSS devices 105 and 110 are shown. In general, the first NSS device 105 and second NSS device 110 may be a combination of NSS antennas or NSS receivers. For example, in one embodiment, as shown in FIG. 2A, both first NSS device 105 and second NSS device 110 may be stand-alone NSS antenna/receiver systems. For example, NSS device 105 may include antenna 106, receiver 107, data storage 222 and a communications module 215. Similarly, NSS device 110 may include antenna 111, receiver 112, data storage 222 and a communications module 215. In addition, FIG. 2A also shows an additional communications module 217 that couples first NSS device 105 and second NSS device 110 with a computer system 800. In other words, in FIG. 2A, each antenna has a NSS receiver integrated within it. One integrated unit then transmits its position or other observed results to the other via a cable. The second processor then calculates the tip's position.

In another embodiment, as shown in FIG. 2B, one or both of first NSS device 105 and second NSS device 110 may only be antenna coupled to a single receiver. For example, second NSS device 1110 may consist of only an antenna 111 coupled with receiver 107 of first NSS device 105 while first NSS device 105 also includes an antenna 106, communications module 215 and data storage 222. Similarly, in another embodiment, the arrangement may be reversed. That is, first NSS device 105 may be an antenna coupled with second NSS device 110 which is an antenna/receiver.

In other words, in FIG. 2B each antenna feeds its signals to a combined NSS signal processor ("dual receiver") unit, instead of processing the signals individually. The central processor could be located under the upper or lower antenna.

In yet an embodiment, each antenna has a NSS receiver integrated within it. One integrated unit then transmits its position or other observed results to the other via a local area radio link such as Bluetooth, or the like. A non-electrical connection removes the need for a cable above the lower antenna, which would otherwise further compromise the lower antenna's sky view and hence its ability to track satellites 601 of FIG. 6.

In another embodiment, the top antenna at location one transmits it's unprocessed NSS signals to the central processor using a cable-less solution, such as a Bluetooth or other radio link, optical fibre or optical beam. In yet another embodiment, both antennas comprise and include standard NSS receivers and the calculation of the pole tip and error estimates is performed in a third processor, such as one located in a portable data collector such as computer system 800. Such a data collector may include a Trimble TSC-3, or a Trimble Tablet computer known as the Yuma.

In one embodiment, the computer system 800 may be a stand-alone unit that is coupled to the data outputs of the NSS receivers via a wireless link, such as Bluetooth, or other wireless communications system.

In one embodiment, the surveyor's pole 115 is equipped with a switch configured to change state (turn on or off) when the pole point 120 is planted on the ground as described herein. For example, the switch actuation initiates a switch-based process that chooses at least one each of the NSS antenna location data elements taken within the time interval from time of switch actuation to just after, and performs the calculation of location of the pole point, and then stores that pole point spatial location in the database, along with a time of determination. In one embodiment, the pole point may be planted on the ground for at least a few hundred milliseconds. In general, the NSS receivers provide a position fix every 50-100 milliseconds, so that the pole point location will be fixed for a short period of time, during which the spatial relationship determiner can process the antenna data obtained in the next 100-200 milliseconds, and deliver a pole point spatial location fix.

One embodiment, calculates the pole tip "point" location in real time. Another embodiment calculates the pole tip "point" location in subsequent time, post-processed. In yet another embodiment, calculation of the pole tip "point" location is according to a determination of a suitable time interval when the pole tip "point" is planted in a fixed location (for example 0.25-0.5 seconds, or longer). In one embodiment, the storage of position fixes where each is stored at a marked time based on GPS/NSS time, and where each data point for both 1st and 2nd antenna time of storage matches in time. For example, simultaneous measurements of each antenna locations are stored. In another embodiment, allow for a time interval over which spatial locations can be selected for each antenna spatial location, on the order of 0.25-0.5 second.

Figure 3A:
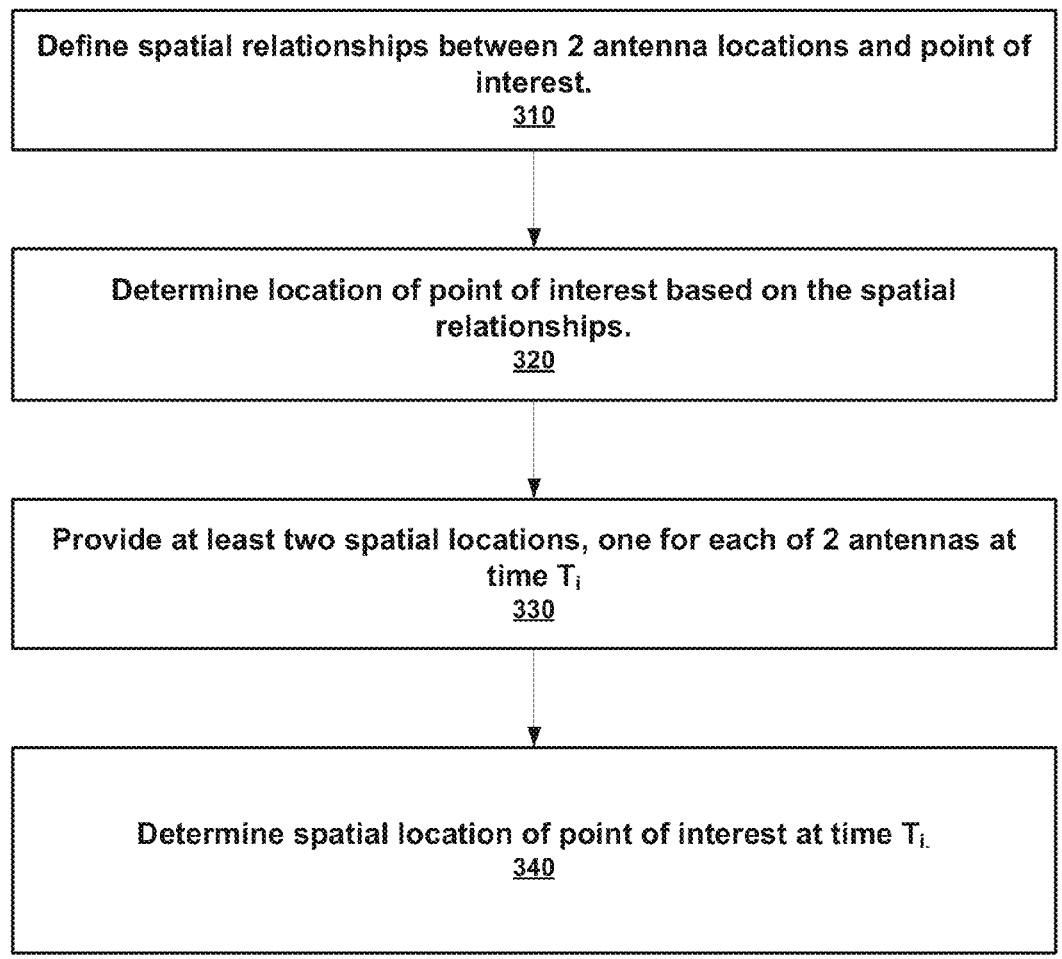
FIG. 3A is a flowchart of a method for point measurement system using two NSS antennas, according to one embodiment of the present technology.

With reference now to FIG. 3A, a flowchart of one embodiment for determining position is shown. At 310, one embodiment defines the spatial relationship between the two antenna locations 105 and 110 and a point of interest 120. For example as shown in FIG. 1A, the spatial relationship is defined by distances 136 and 139.

Referring now to 320, one embodiment determines the location of point of interest based on the definition of spatial relationships. At 330, one embodiment provides at least two spatial locations, one for each of two antennas at time $T_i$. At 340, one embodiment determines the spatial location of point of interest at time $T_i$.

Figure 3B:
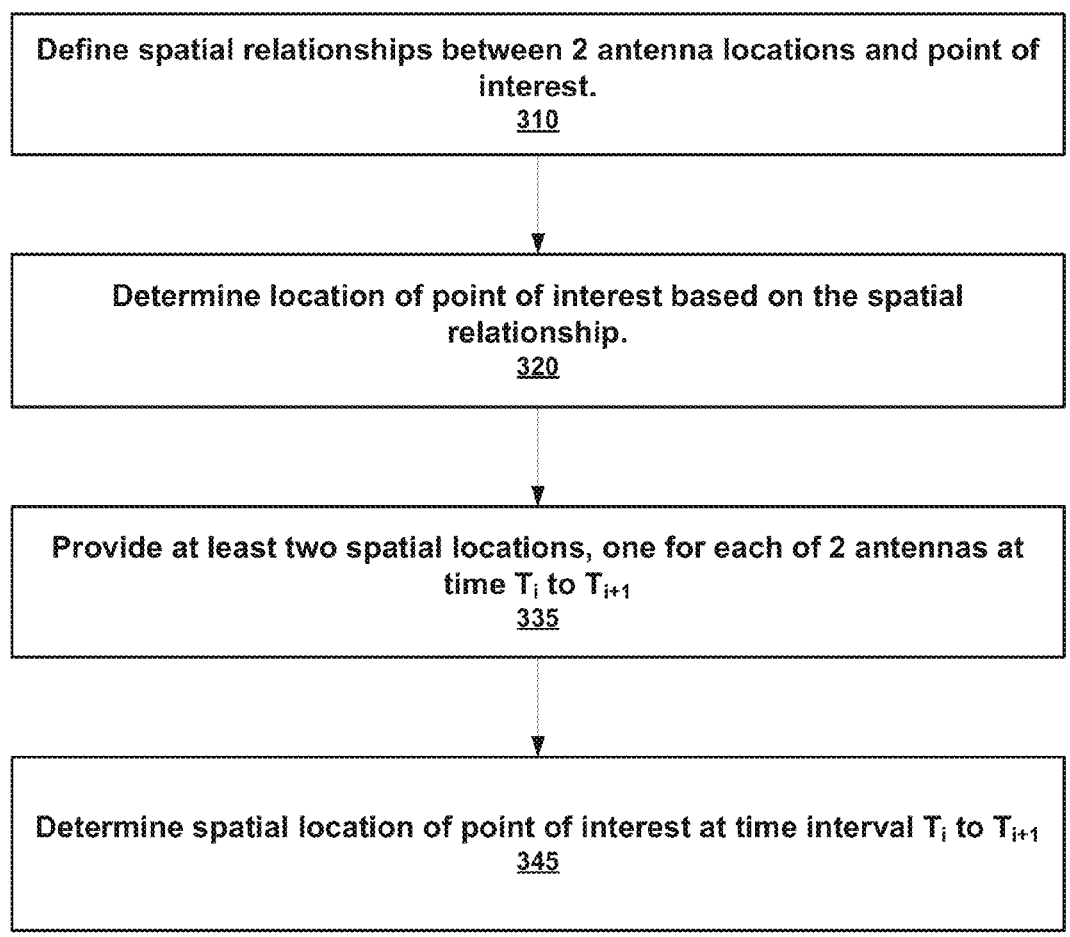
FIG. 3B is a flowchart of a method for point measurement system using two NSS receivers, according to another embodiment of the present technology.

With reference to FIG. 3B, at 310, one embodiment provides definition of spatial relationship between 2 antenna locations 105 and 110 and a point of interest 120. At 320, one embodiment provides algorithm for determining location of point of interest based on the definition of spatial relationships. At 335, one embodiment provides at least two spatial locations, one for each of two antennas at time $T_i$ to $T_{i+1}$. At 345, one embodiment performs a location determination algorithm to determine spatial location of point of interest at time interval $T_i$ to $T_{i+1}$.

Figure 4:
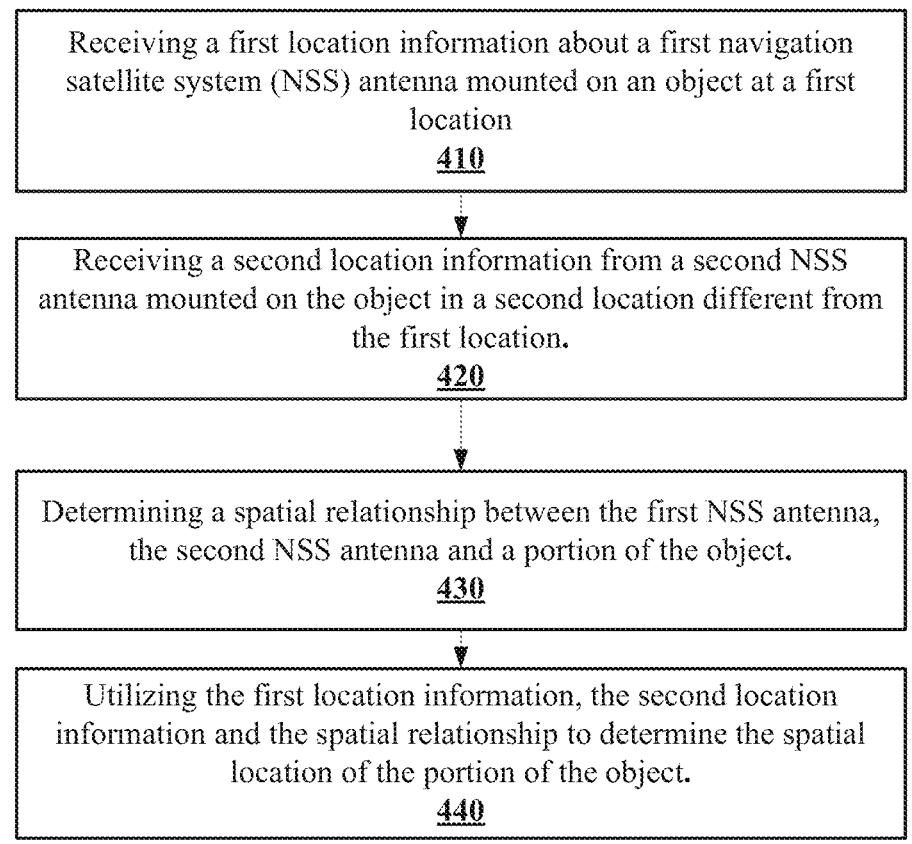
FIG. 4 is a flowchart of a method for point measurement system using two NSS locations, according to one embodiment of the present technology.

With reference to FIG. 4 and also FIGS. 1A and 1B, at 410 one embodiment receives first location information about a first NSS antenna 106 mounted on an object 115 at a first location.

Referring now to 420, one embodiment receives second location information from a second NSS antenna 111 mounted on the object 115 in a second location different from the first location. As described herein, one embodiment utilizes a pressure-type switch at the distal end of the object 115 to trigger the generation of the first location information and the second location information.

With reference now to 430, one embodiment determines a spatial relationship between the first NSS antenna 106, the second NSS antenna 111 and a portion of the object; e.g., point 120. For example, in FIG. 1B, the spatial relationship is shown by distances 136 and 139. In one embodiment, first NSS antenna 106 and the second NSS antenna 111 are fixedly coupled to the object 115 during manufacture, such that the spatial relationship, e.g., the distances 136 and 139, is non-adjustable.

In another embodiment, first NSS antenna 106 and the second NSS antenna 111 are removably coupled to the object 115, such that the spatial relationship, e.g., the distances 136 and 139, is adjustable.

Figure 5:
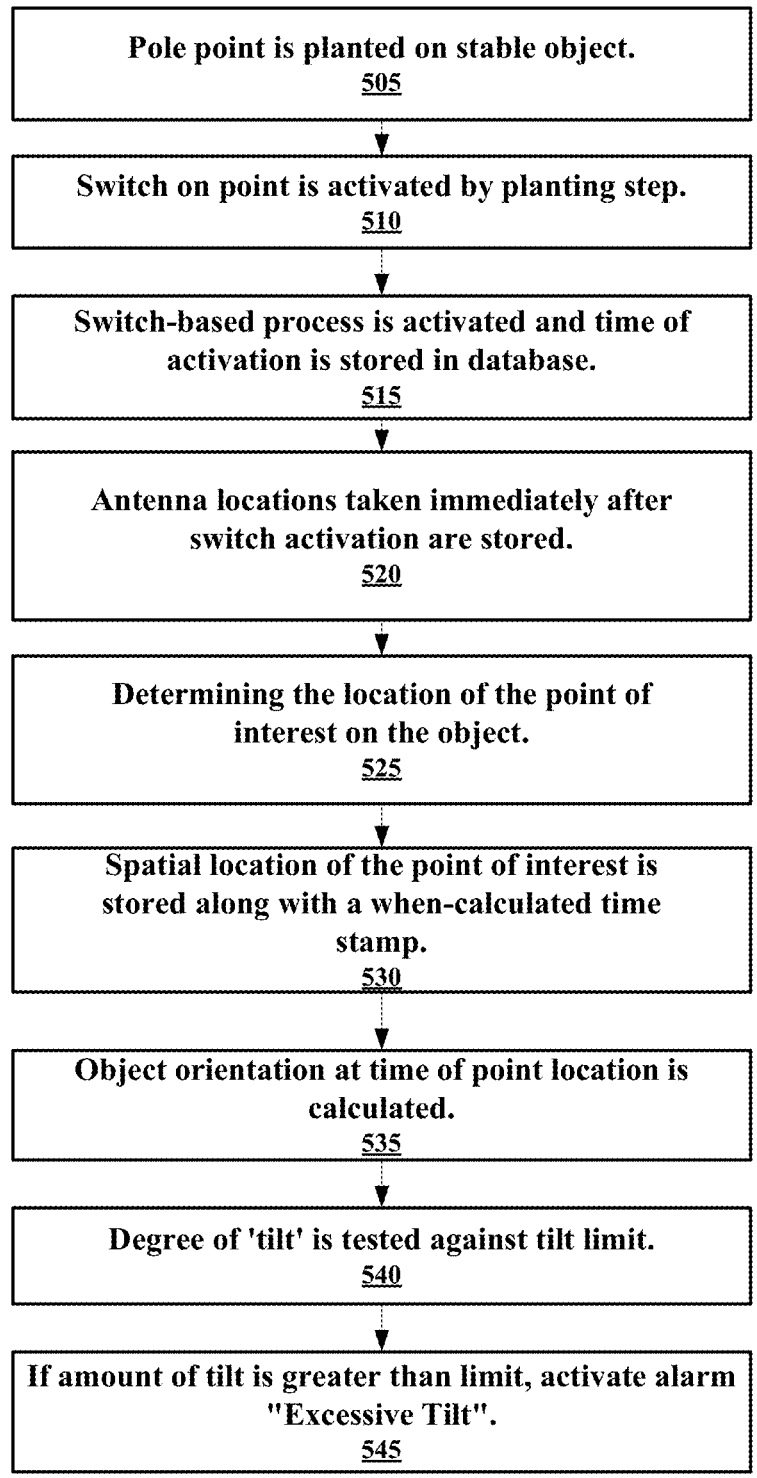
FIG. 5 is a flowchart of a method for point measurement system using two NSS receivers, according to one embodiment of the present technology.
Figure 6:
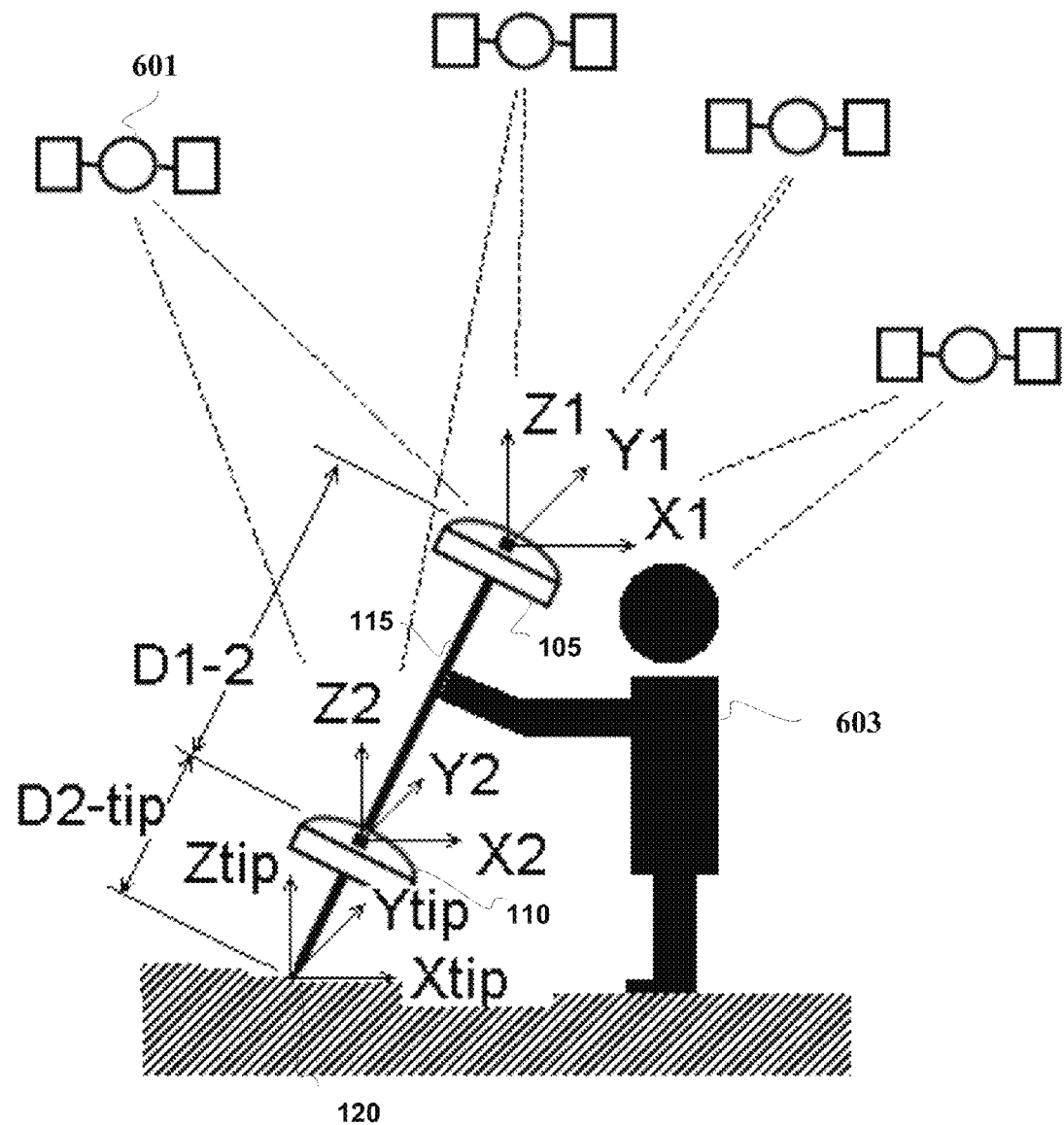
FIG. 6 illustrates a point measurement system using two NSS receivers mounted on a pole, in accordance with an embodiment of the present technology.

Referring now to 440, one embodiment utilizes the first location information, the second location information and the spatial relationship to determine the spatial location of the portion of the object as described in further detail in the discussion of FIGS. 5 and 6.

With reference now to FIG. 5, an example flowchart of one embodiment of the operation of the position determination system is provided. At 505, pole point 120 is planted on a stable object such as the ground. With reference now to 510, a switch on point 120 is activated by planting 505. At 515, a switch-based process is activated and time of activation is stored in a database. With reference now to 520 antenna locations are taken immediately after switch activation and are stored and fed to the processor. At 525, one embodiment determines the location of the point of interest on the object. Referring now to 530, the spatial location of the point of interest is stored along with a when-calculated time stamp. At 535, object orientation at time of point location is calculated.

With reference now to 540, the degree of 'tilt' is tested against the tilt limit. In one embodiment, at 545, if the amount of tilt is greater than limit, an "Excessive Tilt" alarm is activated. In another embodiment, if the amount of tilt is greater than the tilt limit, e.g., the tilt is outside of the pre-defined tilt angle, the measurement is not automatically performed. However, one embodiment may provide a user 603 override such that a measurement will be performed if the tilt is outside of the pre-defined tilt angle but the data will be marked to show that the measurement was taken outside of the tilt limit. In other words, in one embodiment, location data can be selected to be received by the user selectable override while the object is outside of the pre-defined tilt angle.

Referring now to FIG. 6, two NSS antenna/receivers 105 and 110 are mounted on a pole 115 with a distal end 120. In addition, a plurality of satellites 601 is shown. In general, FIG. 6 illustrates a position measurement of the spatial location of a point on an object like a surveyor's pole 115, where the NSS antenna/receiver system is not immediately co-located with the spot whose location is to be determined, but rather is separated. By way of example, in an embodiment, there are two NSS receivers with antennas mounted at the top and near the bottom of a surveyor's pole, so that the two antennas, whose spatial location is determined by the NSS receivers, are aligned to be coaxial with the pointed end of the survey pole, and separated by known distances from each other.

For example, the NSS antenna has a known location element, often referred to as its phase center. The NSS receiver calculates the location in space, in the GPS or NSS coordinate system, of this phase center. The phase center is precisely located at a known point with respect to the physical housing covering the antenna. In one embodiment, the exact location must be taken into account when entering the distance from one of the antennas used as the reference, to the point of interest on the object. For example, in one embodiment the phase center location is 1 cm beneath the top of the antenna housing.

For example, given this alignment of two antennas 105 and 110 as well as the pointed end 120 of the pole 115, and the coaxial, linear alignment, it is possible to take two position fixes at approximately the same time, one from each antenna, and determine the vector distance in a local coordinate system from the two spatial locations to the bottom point of the survey pole. One antenna can give a spatial location relative to the pole's pointed end, and the other antenna gives the vector direction from the first antenna to the pole. In a vector space, the pole bottom point spatial location is completely determined. The advantage of this embodiment is that no time or effort need be taken to align the pole to a vertical position; and no other measurement is needed, since the pole orientation and location in space is completely determined by the spatial location of the two antennas.

For example, one embodiment measures the distance between the two receivers, defined as $D_{1-2}$, and the distance from the second receiver to the tip of the point, defined as $D_{2-tip}$, as follows.

First calculate the slope for each vector space component, which is the change in X coordinate as one travels along the rod:

$$X \text{ slope}=(X_2-X_1)/D_{1-2}$$

Using the first NSS receiver location, defined as Antenna Position Coordinate 1, or $APC_1$, as the primary reference point find the X coordinate distance from that reference point to the X-coordinate location of the tip $X_{tip}$:

$$\text{Distance from tip to } APC_1 = D_{1-tip} = D_{2-tip} + D_{1-2}$$

$$X_{tip}=X_1+X\text{-slope}*D_{1-tip} [\text{* denotes multiplication}]$$

$$X_{tip}=X_1+[(X_2-X_1)/D_{1-2}]*(D_{2-tip}+D_{1-2})$$

Y and Z are calculated similarly where Y coordinates are substituted for X, and Z coordinates are similarly substituted.

$$Y\text{-slope}=(Y_2-Y_1)/D_{1-2}$$

$$Y_{tip}=Y_1+Y\text{-slope}*D_{1-tip}$$

$$Y_{tip}=Y_1+[(Y_2-Y_1)/D_{1-2}]*(D_{2-tip}+D_{1-2})$$

$$Z\text{-slope}=(Z_2-Z_1)/D_{1-2}$$

$$Z_{tip}=Z_1+Z\text{-slope}*D_{1-tip}$$

$$Z_{tip}=Z_1+[(Z_2-Z_1)/D_{1-2}]*(D_{2-tip}+D_{1-2})$$

In the above embodiment, the topmost antenna at the first location is the main reference. But the bottom antenna at the second location, defined as $APC_2$, can also be the reference in another embodiment. In this embodiment, the slope determination is the same, but the equation for the coordinate of the tip of the point of interest becomes $$\text{Distance from tip to } APC_2 = D_{2-tip}$$

$$X_{tip}=X_2+[(X_2-X_1)/D_{1-2}]*D_{2-tip}$$

Similarly the equations for Y and Z can be modified accordingly.

Referring still to FIG. 6, the two NSS antenna locations are stored in a memory as a data element, preferably in a database, with a time stamp indicating time of obtaining the location data element. The data element comprises three items, representing X, Y, and Z coordinates in a spatial regime. This regime may be latitude, longitude, and altitude, or may be any other coordinate system regime, such as the one used in the basic GPS coordinate system, not yet converted to Lat-Long-Altitude. The time stamp may be comprise GPS/NSS time, which is produced by the NSS receivers as part of their normal signal processing.

In an embodiment, a computer system 800 is configured to retrieve a pair of data elements for the spatial location of each of the two NSS antennas from the database/memory storage, and produce the point of interest on the object of interest, namely the bottom point on the surveyor's pole 120, and store that spatial location of the point in the database or memory storage facility, along with a time stamp of the time of calculation.

As stated herein, a limit of the amount of tilt from local vertical can be applied to the pole point location data, and if the amount of tilt exceeds this limit, an alarm may be generated for the surveyor, indicating that he should retake the data at the desired spot. In an embodiment, the "Excess Tilt" alarm may be an audio alarm, or a visual alarm delivered via a light on the data collector or on the NSS receiver package at the top of the surveyor's pole.

Moreover, one embodiment is configured to collect the data without regard to the use of a switch. Instead, the location of the point of interest, e.g., the pole point 120, is calculated continuously based on the data collected and stored in the database/memory. The data may be post-processed in a separate program, a "Spot-Finder" program, configured to analyze the point location data and to compare each data point to the next. When the difference between successive data points is less than a specified threshold distance, for example, 1 cm, then those data points may be assumed to be the location where the pole point was planted, and so this group of data points may be selected to be designated the location of the spot where the surveyor planted the pole. This spot-finder program may be operated in the same data collector processor in real time as well as in post-processed environment.

Although the lower antenna 111 may have a greater influence on the determination of the location of the tip of the point 120, its accuracy may be slightly diminished due to its location near the ground, from a variety of effects, including reflections from multipath signals. Another method to calculate the instantaneous positions of the two receivers can be found in U.S. Patent Application 2010021416, by Talbot et al., entitled "NSS Moving Base Position", assigned to the same assignee and incorporated by reference in its entirety herein.

Another method for delivering virtual reference station data can be found in U.S. Pat. No. 7,480,511, by Brent O'Meagher entitled "Method and System for Delivering Virtual Reference Station Data", assigned to the same assignee and incorporated by reference in its entirety herein.

NSS Receiver

Figure 7:
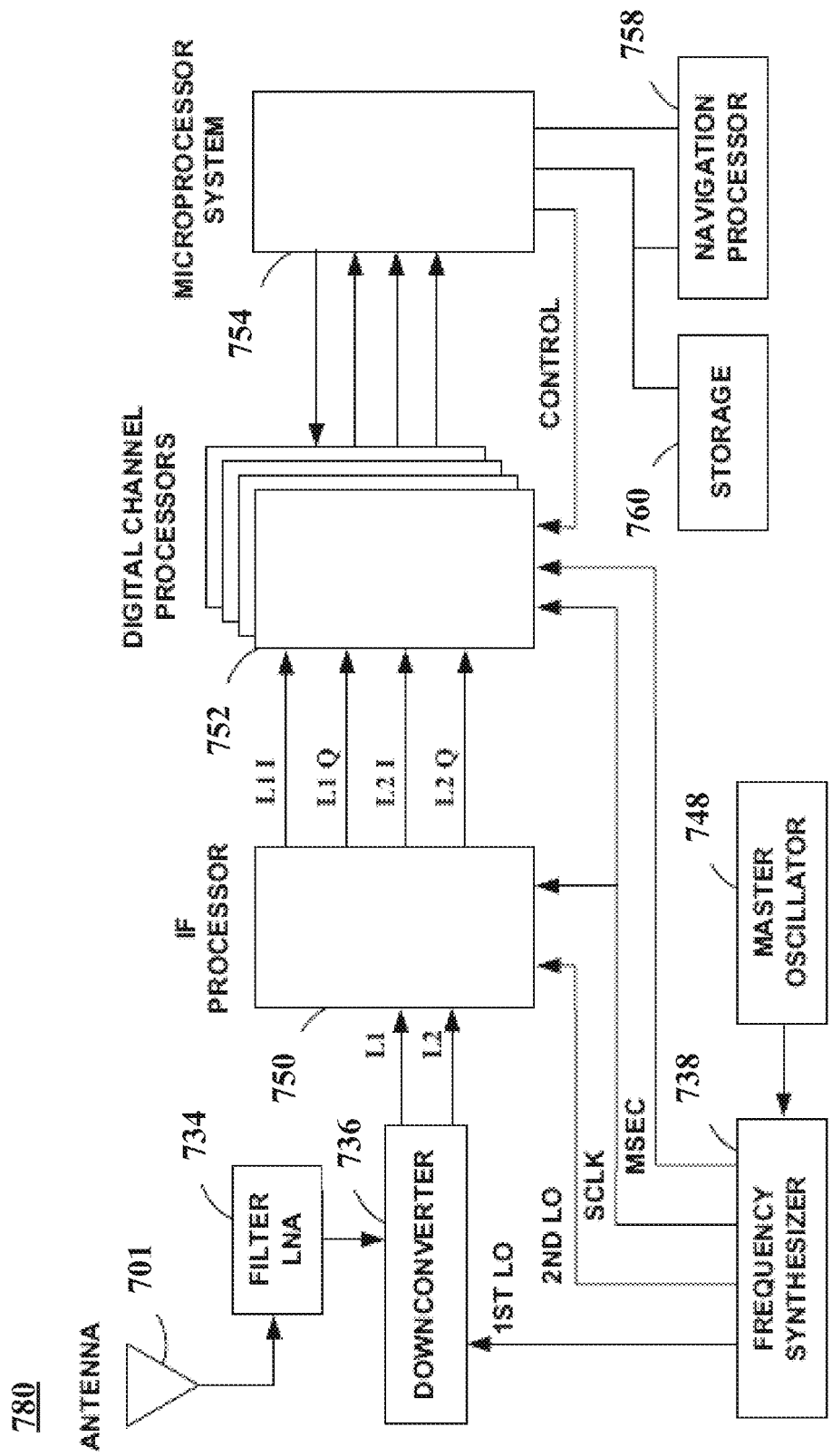
FIG. 7 is a block diagram of an example navigation satellite system (NSS) receiver which may be used in accordance with one embodiment of the present technology.

With reference now to FIG. 7, a block diagram is shown of an embodiment of an example NSS receiver which may be used in accordance with various embodiments described herein. In particular, FIG. 7 illustrates a block diagram of a NSS receiver in the form of a general purpose GPS receiver 780 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" NSS receivers such as those used in the military and some civilian applications. Typically, the "consumer" grade NSS receivers do not access the L2 signal(s). Further, although L1 and L2 signals are described, they should not be construed as a limitation to the signal type; instead, the use of the L1 and L2 signal(s) is provided merely for clarity in the present discussion.

Although an embodiment of a GNSS receiver and operation with respect to GPS is described herein, the technology is well suited for use with numerous other GNSS signal(s) including, but not limited to, GPS signal(s), Glonass signal (s), Galileo signal(s), and Compass signal(s).

The technology is also well suited for use with regional navigation satellite system signal(s) including, but not limited to, Omnistar signal(s), StarFire signal(s), Centerpoint signal(s), Beidou signal(s), Doppler orbitography and radio-positioning integrated by satellite (DORIS) signal(s), Indian regional navigational satellite system (IRNSS) signal(s), quasi-zenith satellite system (QZSS) signal(s), and the like.

Moreover, the technology may utilize various satellite based augmentation system (SBAS) signal(s) such as, but not limited to, wide area augmentation system (WAAS) signal(s), European geostationary navigation overlay service (EGNOS) signal(s), multi-functional satellite augmentation system (MSAS) signal(s), GPS aided geo augmented navigation (GAGAN) signal(s), and the like.

In addition, the technology may further utilize ground based augmentation systems (GBAS) signal(s) such as, but not limited to, local area augmentation system (LAAS) signal(s), ground-based regional augmentation system (GRAS) signals, Differential GPS (DGPS) signal(s), continuously operating reference stations (CORS) signal(s), and the like.

Although the example herein utilizes GPS, the present technology may utilize any of the plurality of different navigation system signal(s). Moreover, the present technology may utilize two or more different types of navigation system signal(s) to generate location information. Thus, although a GPS operational example is provided herein it is merely for purposes of clarity.

Embodiments of the present technology may be utilized by NSS receivers which access the L1 signals alone, or in combination with the L2 signal(s). A more detailed discussion of the function of a receiver such as GPS receiver 780 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 780 of FIG. 7.

In FIG. 7, received L1 and L2 signal is generated by at least one GPS satellite. Each GPS satellite generates different signal L1 and L2 signals and they are processed by different digital channel processors 752 which operate in the same way as one another. FIG. 7 shows GPS signals (L1=1575.42 MHz, L2=1227.60 MHz) entering GPS receiver 780 through a dual frequency antenna 701. Antenna 701 may be a magnetically mountable model commercially available from Trimble® Navigation of Sunnyvale, Calif., 94085. Master oscillator 748 provides the reference oscillator which drives all other clocks in the system. Frequency synthesizer 738 takes the output of master oscillator 748 and generates important clock and local oscillator frequencies used throughout the system. For example, in one embodiment frequency synthesizer 738 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 734 performs filtering and low noise amplification of both L1 and L2 signals. The noise figure of GPS receiver 780 is dictated by the performance of the filter/LNA combination. The downconverter 736 mixes both L1 and L2 signals in frequency down to approximately 175 MHz and outputs the analogue L1 and L2 signals into an IF (intermediate frequency) processor 30. IF processor 750 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 752 inputs the digitally sampled L1 and L2 inphase and quadrature signals. All digital channel processors 752 are typically identical by design and typically operate on identical input samples. Each digital channel processor 752 is designed to digitally track the L1 and L2 signals produced by one satellite by tracking code and carrier signals and to form code and carrier phase measurements in conjunction with the microprocessor system 754. One digital channel processor 752 is capable of tracking one satellite in both L1 and L2 channels.

Microprocessor system 754 is a general purpose computing device which facilitates tracking and measurements processes, providing pseudorange and carrier phase measurements for a navigation processor 758. In one embodiment, microprocessor system 754 provides signals to control the operation of one or more digital channel processors 752. Navigation processor 758 performs the higher level function of combining measurements in such a way as to produce position, velocity and time information for the differential and surveying functions. Storage 760 is coupled with navigation processor 758 and microprocessor system 754. It is appreciated that storage 760 may comprise a volatile or non-volatile storage such as a RAM or ROM, or some other computer readable memory device or media.

One example of a GPS chipset upon which embodiments of the present technology may be implemented is the Maxwell™ chipset which is commercially available from Trimble® Navigation of Sunnyvale, Calif., 94085.

Computer System

Figure 8:
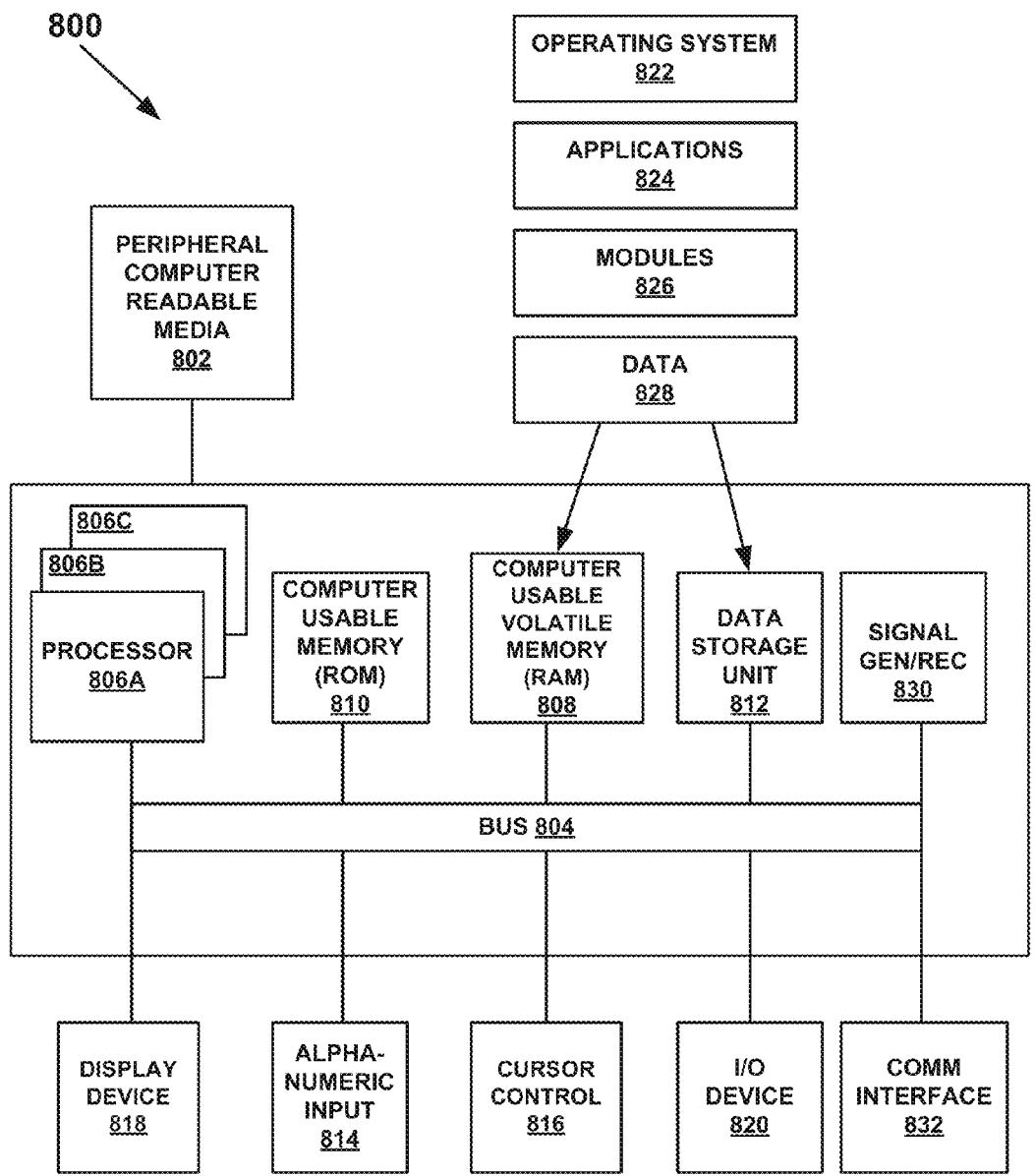
FIG. 8 is a block diagram of an example computer system upon which embodiments of the present technology may be implemented.

With reference now to FIG. 8, portions of the technology for providing a communication composed of non-transitory computer-readable and computer-executable instructions that reside, for example, in non-transitory computer-usable storage media of a computer system. That is, FIG. 8 illustrates one example of a type of computer that can be used to implement embodiments of the present technology. FIG. 8 represents a system or components that may be use in conjunction with aspects of the present technology. In one embodiment, some or all of the components of FIG. 1 or FIGS. 3A and 3B may be combined with some or all of the components of FIG. 8 to practice the present technology.

FIG. 8 illustrates an example computer system 800 used in accordance with embodiments of the present technology. It is appreciated that system 800 of FIG. 8 is an example only and that the present technology can operate on or within a number of different computer systems including general purpose networked computer systems, embedded computer systems, routers, switches, server devices, user devices, various intermediate devices/artifacts, stand alone computer systems, mobile phones, personal data assistants, televisions and the like. As shown in FIG. 8, computer system 800 of FIG. 8 is well adapted to having peripheral computer readable media 802 such as, for example, a floppy disk, a compact disc, and the like coupled thereto.

System 800 of FIG. 8 includes an address/data bus 804 for communicating information, and a processor 806A coupled to bus 804 for processing information and instructions. As depicted in FIG. 8, system 800 is also well suited to a multi-processor environment in which a plurality of processors 806A, 806B, and 806C are present. Conversely, system 800 is also well suited to having a single processor such as, for example, processor 806A. Processors 806A, 806B, and 806C may be any of various types of microprocessors. System 800 also includes data storage features such as a computer usable volatile memory 808, e.g. random access memory (RAM), coupled to bus 804 for storing information and instructions for processors 806A, 806B, and 806C.

System 800 also includes computer usable non-volatile memory 810, e.g. read only memory (ROM), coupled to bus 804 for storing static information and instructions for processors 806A, 806B, and 806C. Also present in system 800 is a data storage unit 812 (e.g., a magnetic or optical disk and disk drive) coupled to bus 804 for storing information and instructions. System 800 also includes an optional alphanumeric input device 814 including alphanumeric and function keys coupled to bus 804 for communicating information and command selections to processor 806A or processors 806A, 806B, and 806C. System 800 also includes an optional cursor control device 816 coupled to bus 804 for communicating user input information and command selections to processor 806A or processors 806A, 806B, and 806C. System 800 of the present embodiment also includes an optional display device 818 coupled to bus 804 for displaying information.

Referring still to FIG. 8, optional display device 818 of FIG. 8 may be a liquid crystal device, cathode ray tube, plasma display device or other display device suitable for creating graphic images and alpha-numeric characters recognizable to a user. Optional cursor control device 816 allows the computer user to dynamically signal the movement of a visible symbol (cursor) on a display screen of display device 818. Many implementations of cursor control device 816 are known in the art including a trackball, mouse, touch pad, joystick or special keys on alpha-numeric input device 814 capable of signaling movement of a given direction or manner of displacement. Alternatively, it will be appreciated that a cursor can be directed and/or activated via input from alpha-numeric input device 814 using special keys and key sequence commands.

System 800 is also well suited to having a cursor directed by other means such as, for example, voice commands. System 800 also includes an I/O device 820 for coupling system 800 with external entities. For example, in one embodiment, I/O device 820 is a modem for enabling wired or wireless communications between system 800 and an external network such as, but not limited to, the Internet. A more detailed discussion of the present technology is found below.

Referring still to FIG. 8, various other components are depicted for system 800. Specifically, when present, an operating system 822, applications 824, modules 826, and data 828 are shown as typically residing in one or some combination of computer usable volatile memory 808, e.g. random access memory (RAM), and data storage unit 812. However, it is appreciated that in some embodiments, operating system 822 may be stored in other locations such as on a network or on a flash drive; and that further, operating system 822 may be accessed from a remote location via, for example, a coupling to the internet. In one embodiment, the present technology, for example, is stored as an application 824 or module 826 in memory locations within RAM 808 and memory areas within data storage unit 812. The present technology may be applied to one or more elements of described system 800. For example, a method of modifying user interface 228A of device 118A may be applied to operating system 822, applications 824, modules 826, and/or data 828.

System 800 also includes one or more signal generating and receiving device(s) 830 coupled with bus 804 for enabling system 800 to interface with other electronic devices and computer systems. Signal generating and receiving device(s) 830 of the present embodiment may include wired serial adaptors, modems, and network adaptors, wireless modems, and wireless network adaptors, and other such communication technology. The signal generating and receiving device(s) 830 may work in conjunction with one or more communication interface(s) 832 for coupling information to and/or from system 800. Communication interface 832 may include a serial port, parallel port, Universal Serial Bus (USB), Ethernet port, antenna, or other input/output interface. Communication interface 832 may physically, electrically, optically, or wirelessly (e.g. via radio frequency) couple system 800 with another device, such as a cellular telephone, radio, or computer system.

The computing system 800 is only one example of a suitable computing environment and is not intended to suggest any limitation as to the scope of use or functionality of the present technology. Neither should the computing environment 800 be interpreted as having any dependency or requirement relating to any one or combination of components illustrated in the example computing system 800.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Instrument Conveyor

In general, the NSS instrument conveyor provides a mobile platform including a mobility device such as a set of wheels attached to the platform and a controller for controlling the platform's motion. The instrument conveyor also provides a mechanical coupling assembly to couple the NSS device to the mobile platform. The mechanical assembly additionally provides an adjustable position mechanism for raising and lowering the survey instrument relative to the mobile platform.

While using the wheeled platform conveyance system in suitable terrain, it may reduce stress and strain on the surveyor performing the survey. Moreover, the instrument conveyor can perform measurements in the same manner as described herein with respect to a user carrying the pole. For example, the user may specifically activate the measurement by direct action such as providing an input command, raising or lowering the handle, or the like. However, the user may also slow or stop the cart at certain locations while it is being pulled and that point will be flagged.

For example, instead of activating the measurement manually, the measurement device may continually take and store measurement data while it is activated. For example, during or after the surveyors walk, one embodiment compares the distance covered between sequential measurements and determines the magnitude of the difference in distance between the two measurement locations. If the distance between the two points is less than a specified threshold, the data point is marked as being a fixed spot or "surveyed point".

Figure 9A:
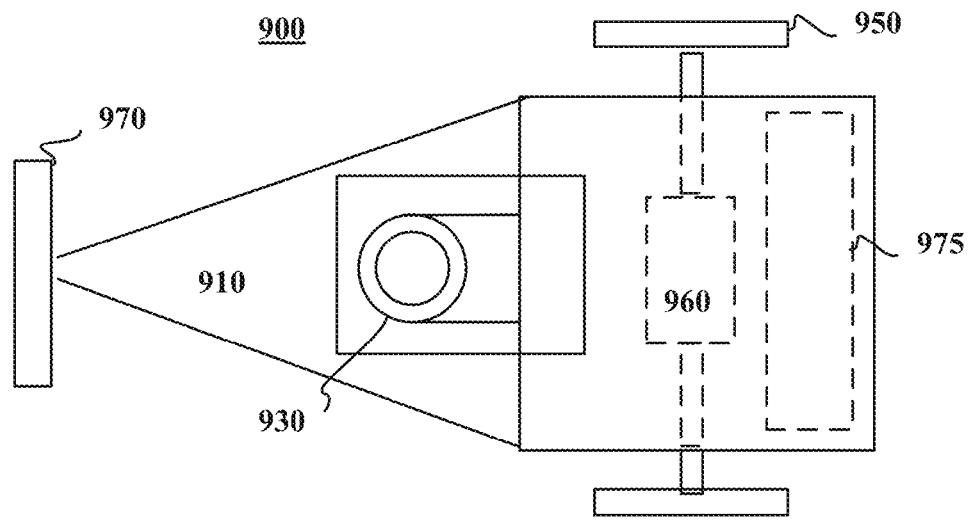
FIG. 9A is a top view of a mobile position determination system, according to one embodiment of the present technology.
Figure 9B:
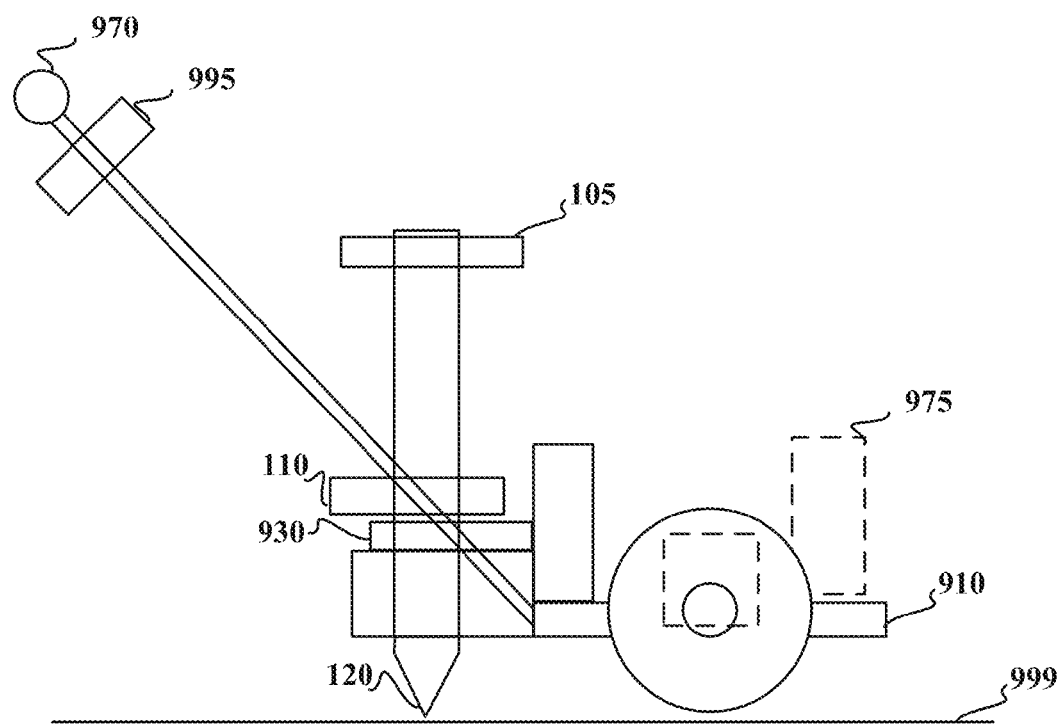
FIG. 9B is a side view of a mobile position determination system, according to one embodiment of the present technology.

An embodiment of this coaxial dual receiver system is shown at 900 of FIGS. 9A and 9B in a top and side view respectively. In one embodiment, mobile platform 900 includes the pole 115 on a small platform 910, equipped with wheels 950 and arranged so that the pointed end of the pole 115 is carried a bit above ground 999 to facilitate moving the wheeled platform 900. Upon arriving at the desired spot to be surveyed, the user activates a mechanism 930 that moves, or drops, the pointed end 120 of the pole 115 on the ground 999. Similarly, the same mechanism 930 can be used to restore the pole 115 to its slightly elevated position where the point 120 is no longer touching the ground 999. This enables easier movement of the wheeled platform 900. In an embodiment, the mechanism 930 may consist of a battery-powered motorized lift system, and a motorized lowering system.

In one embodiment, mobile platform 900 may be equipped with a handle or extension arm 970. In one embodiment, the handle extends at a 45-60 degree angle from the platform for around 2.5-3 feet, so that the user can easily manually propel and guide it along a desired path, going from a first desired survey spot to a second, and so on.

Extension arm 970 may include a control to activate the pole planting/dropping mechanism to deploy or retract point 120. In one embodiment, extension arm 970 may include an optional screen 995, such as a Yuma Tablet Computer or a Data Controller (such as a TSC-3) to ascertain any pertinent status data as may be reported by one or the other of the NSS receiver, or by the processor performing the point location calculations. By utilizing an optional screen 995 a user may observe feedback from the receiver survey system including indicated measurement quality, a need for a measurement re-take and the like. In another embodiment, the controls for activating and stopping the motor may be wirelessly controlled by a user's mobile device such as a tablet computer, a Personal Digital Assistant (PDA), handheld remote control, mobile phone, Data Collector 800 associated with the collection and processing of the dual coaxial NSS receiver location data or the like.

In one embodiment, wheeled platform 900 may include a battery-powered drive train to assist the surveyor in doing the conveying. For example, platform 900 may include motor 960 and battery 975. In addition, a suitable control system is included in the platform with controls that may be located on the handle 970. Platform 900 may include a tape measure or other linear distance measuring device.

With reference now to FIG. 10A, the configuration 1020 illustrates an embodiment where the dual coaxial GNSS receiver system on the pole 115. In an alternate embodiment, as shown in configuration 1030 of FIG. 10B it may be possible to eliminate the second receiver system, and take GNSS data with a single receiver. In another embodiment as shown in configuration 1040 of FIG. 10C, the pole is made shorter and therefore lower or closer to the ground.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A survey instrument conveyance comprising:
    a mobile platform comprising:
        a set of wheels attached to the platform;
        a handle attached to the mobile platform, the handle for a user to propel and guide the mobile platform along a path;
    a mechanical coupling assembly to couple a survey instrument to the mobile platform; and
    an adjustable position mechanism coupled to the mechanical coupling assembly to raise and lower the survey instrument relative to the mobile platform.

2. The survey instrument conveyance of claim 1 wherein the survey instrument comprises:
    an object having a point of interest located thereon;
    a first navigation satellite system (NSS) antenna mounted in a first location on the object;
    a second NSS antenna mounted in a second location on the object, wherein the point of interest, the first NSS antenna, and the second NSS antenna have a known coaxial spatial relationship;
    a NSS receiver coupled to the first antenna and to the second antenna, and configured to generate location information for each antenna; and
    a spatial relationship determiner to receive the location of each antenna, and determine the spatial location of the point of interest on the object based on the known spatial relationship between the first NSS antenna, the second NSS antenna, and the point of interest.

3. The survey instrument conveyance of claim 1 further comprising:
    a remote control device for controlling motion of the mobile platform and remotely raising and lowering the survey instrument.

4. The survey instrument conveyance of claim 3 wherein the remote control device is a handheld mobile device selected from the group consisting of: a tablet computer, a mobile phone, a Personal Digital Assistant (PDA) and a handheld remote control.

5. The survey instrument conveyance of claim 1 further comprising:
    a drive motor mounted on the mobile platform and configured to provide power to drive the wheels of the mobile platform.

6. The survey instrument conveyance of claim 5 wherein the drive motor is a combustion motor.

7. The survey instrument conveyance of claim 5 further comprising:
    a battery mounted to the mobile platform, the battery providing power to an electric drive motor to drive the wheels of the survey instrument conveyance.

8. A mobile position determination system, comprising:
    a mobile platform comprising:
        a set of wheels attached thereto; and
        a handle attached to the mobile platform, the handle for a user to propel and guide the mobile platform along a path;
    a survey instrument comprising:
        an object having a point of interest located thereon;
        a first navigation satellite system (NSS) antenna mounted in a first location on the object;
        a second NSS antenna mounted in a second location on the object, wherein the point of interest, the first antenna, and the second antenna have a known coaxial spatial relationship;
        a NSS receiver coupled to the first NSS antenna and to the second NSS antenna, and configured to generate location information for each antenna; and
        a spatial relationship determiner to receive the location of each antenna, and determine the spatial location of the point of interest on the object based on the known spatial relationship between the first NSS antenna, the second NSS antenna, and the point of interest;
    a mechanical coupling assembly to couple the survey instrument to the mobile platform; and
    an adjustable position mechanism coupled to the mechanical coupling assembly to raise and lower the survey instrument relative to the mobile platform.

9. The mobile position determination system of claim 8 further comprising:

a remote control device for controlling motion of the mobile platform and remotely raising and lowering the survey instrument.

10. The mobile position determination system of claim 8 further comprising:
a drive motor mounted on the mobile platform and configured to provide power to drive the wheels of the mobile platform.

11. The mobile position determination system of claim 10 further comprising:
a battery mounted to the mobile platform, the battery providing power to an electric drive motor to drive the wheels of the mobile platform.

12. The mobile position determination system of claim 8 further comprising:
a pressure plate at a distal end of the object to trigger generation of the location information.

13. The mobile position determination system of claim 8 further comprising:
fixedly coupling the first NSS antenna and the second NSS antenna to the object during manufacture, such that the spatial relationship is non-adjustable.

14. The mobile position determination system of claim 8 further comprising:
a single NSS receiver coupled with both the first NSS antenna and the second NSS antenna to determine the location of the first NSS antenna and the second NSS antenna.

15. The mobile position determination system of claim 8 further comprising:
an object tilt determiner;
an alerting device for providing an alert if the object is tilted further than a pre-defined tilt angle;
a user override to force a measurement to be performed if the tilt is outside of the pre-defined tilt angle; and
a data flag to indicate the measurement was taken during the user override while the object was outside of the pre-defined tilt angle.

16. A method for performing a survey with a dual coaxial NSS receiver mobile survey system, the method comprising:
providing a mobile platform comprising:
a set of wheels attached thereto; and
a handle attached to the mobile platform, the handle providing a location for a user to propel and guide the mobile platform along a path;
providing a dual coaxial NSS receiver system on the mobile platform, the dual coaxial NSS receiver system comprising:
a first NSS device and a second NSS device mounted on a pole; and
a known point on the pole indicating the location of a measurement;
providing an adjustable position mechanism coupling the mobile platform to the dual coaxial NSS receiver system, the adjustable position mechanism raising and lowering the survey instrument relative to the mobile platform;
utilizing a NSS receiver coupled to the first NSS device and to the second NSS device, the NSS receiver configured to generate location information for each NSS device;
determining a spatial relationship between each NSS device and the known point, and determining the spatial location of the known point based on the known spatial relationship between the first NSS device, the second NSS device, and the known point;
outputting the spatial location in a user accessible format.

17. The method of claim 16 further comprising:
utilizing a remote control device to control motion of the mobile platform and raise and lower the survey instrument.

18. The method of claim 16 further comprising:
utilizing a pressure plate at a distal end of the object to trigger generation of the location information.

19. The method of claim 16 further comprising:
determining a tilt of the object; and
providing an alert if the object is tilted further than a pre-defined tilt angle.

20. The method of claim 19 further comprising:
stopping a measurement from being performed if the tilt is outside of the pre-defined tilt angle;
providing a user override such that a measurement will be performed if the tilt is outside of the pre-defined tilt angle; and
marking the data to show that the measurement was taken during the user override while the object was outside of the pre-defined tilt angle.

* * * * *